March 1, 1932. J. B. WEBB ET AL 1,847,152
EQUALIZING DRIVE FOR CONVEYER SYSTEMS
Filed March 18, 1930 4 Sheets-Sheet 4
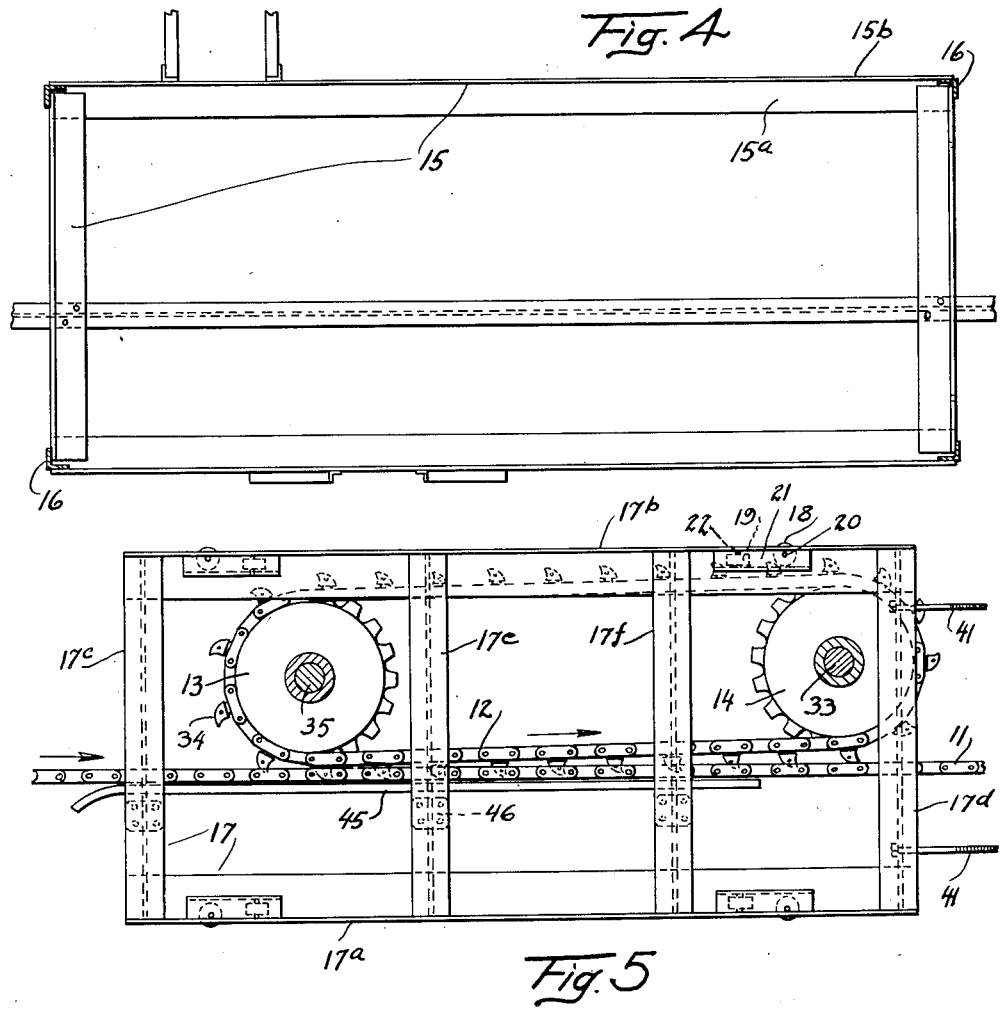
INVENTORS
Jervis B. Webb, Duane A. Blair
and Charles A. Sink
BY
Charles R. Halbert
ATTORNEY.

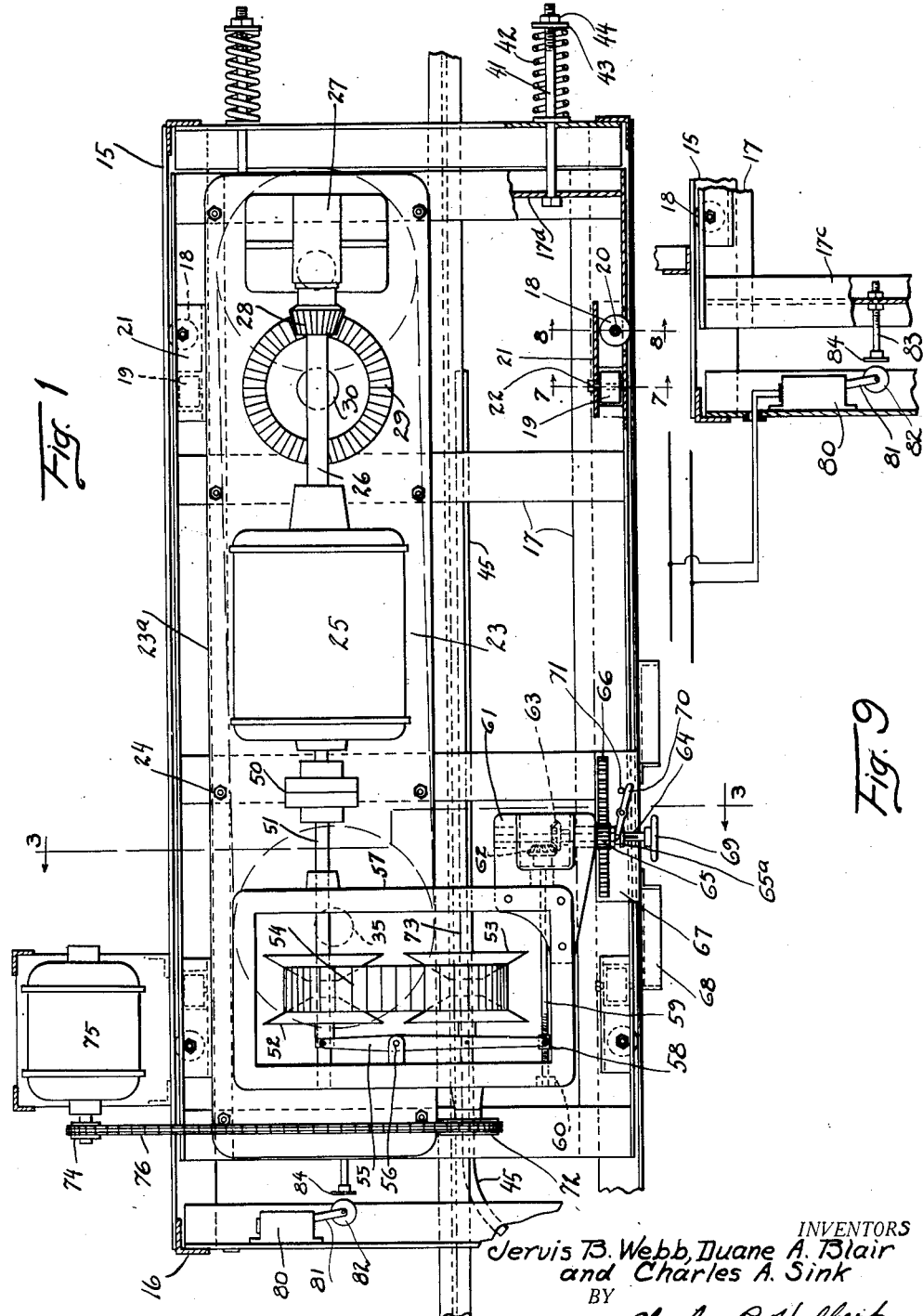

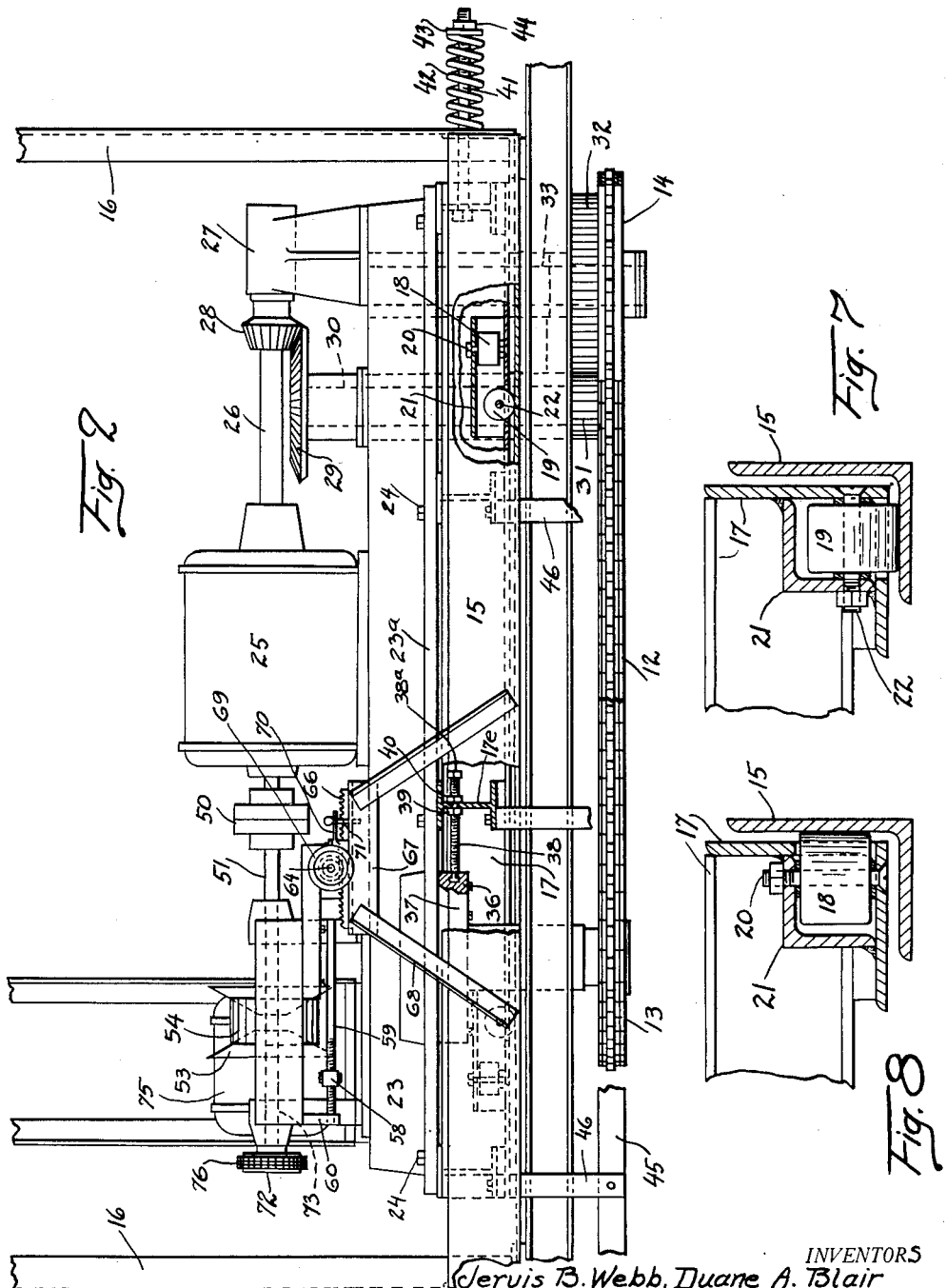

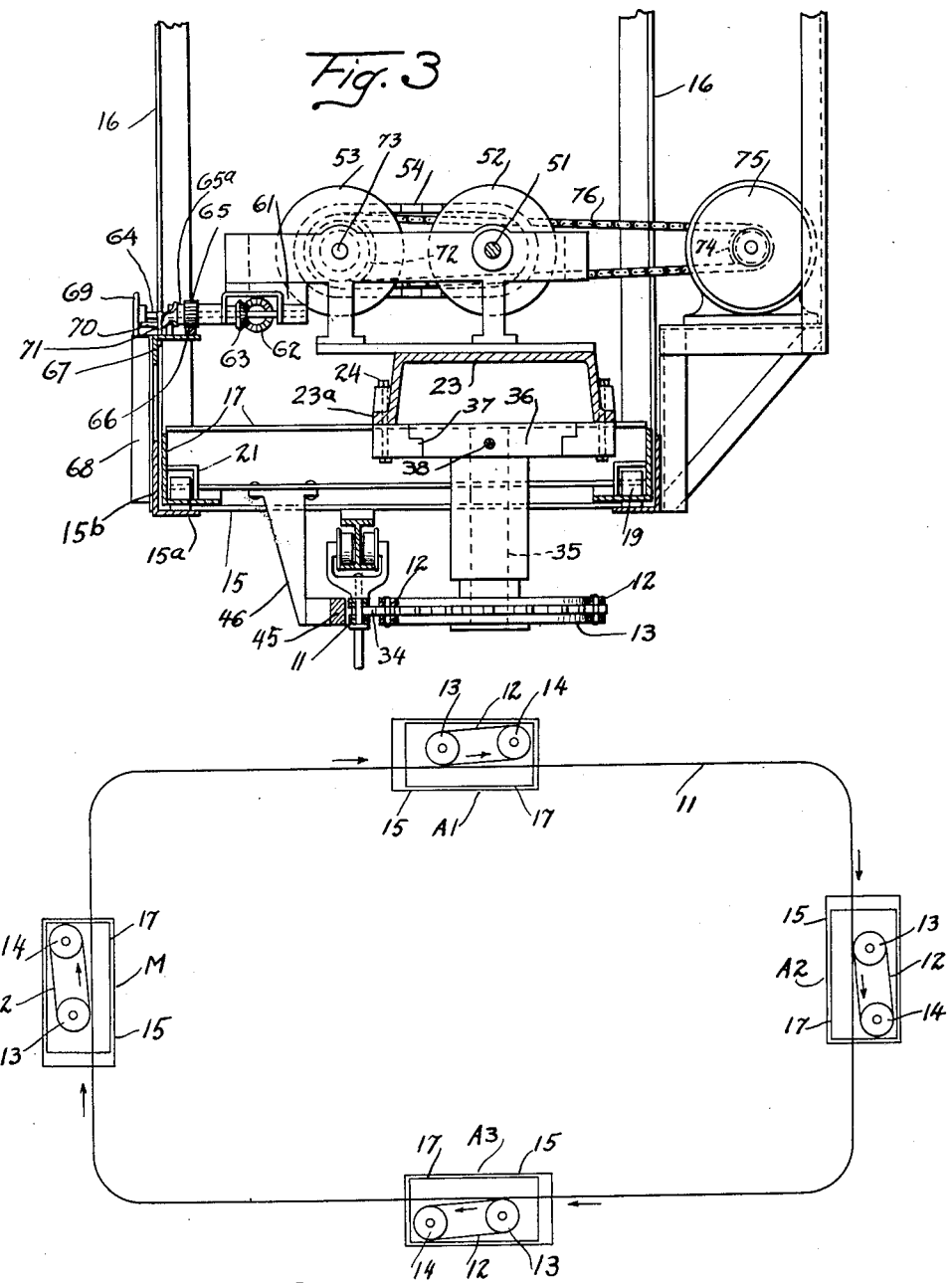

Patented Mar. 1, 1932

1,847,152

UNITED STATES PATENT OFFICE

JERVIS B. WEBB, OF ROYAL OAK, DUANE A. BLAIR, OF DETROIT, AND CHARLES A. SINK, OF PONTIAC, MICHIGAN

EQUALIZING DRIVE FOR CONVEYER SYSTEMS

Application filed March 18, 1930. Serial No. 436,868.

This invention relates to conveyer systems of the type which has comparatively recently come into extensive general use in manufacturing plants for modern high speed production methods of manufacturing, and wherein a continuously operating endless chain conveyer transports articles from one part of a manufacturing plant to another and during which transportation various processing and manufacturing operations are performed by workmen located at various stations along the conveyer's line of travel. One of the most important advantages in the use of such conveyer systems is that the speed of travel of the conveyer may be employed to regulate with marked accuracy the desired or predetermined rate of production, the conveyer acting as a pacemaker for all the workmen no matter how different each man's particular work may be from others. In view of the fact that the entire production of a plant is in many instances dependent upon the operation of the conveyer it is of the utmost importance that the conveyer shall continue to operate without interruption, and that breakage of the conveyer chain, or other accident, be, if possible, entirely obviated, or at least the number of such accidents be reduced to a minimum. As the main conveyer lines, of systems of the type disclosed, are usually hundreds of feet in length, it has been found that the driving load for a very long conveyer is too excessive to be carried by a single drive and that it is highly desirable to employ for such long conveyer lines several drives located at intervals along the conveyer. While the use of a plurality of drives, located at spaced points, overcomes the objection to concentrating the entire driving load on a single drive, it introduces other problems, the solutions of which have proven very difficult. Among such problems may be noted that of securing proper synchronism of the speed of the plurality of drives. Moreover it has been found that even when the desired speed synchronism has been secured, another difficult problem is introduced, namely that of proper compensation for variation in the length of different sections of the conveyer chain. It will be readily understood, that although these conveyer chains are constructed of standardized parts, all of as nearly uniform and accurate dimensions as possible to secure, the fact that each chain, of several hundred feet in length, consists of thousands of links, makes it impossible to obtain exactly uniform lengths for each chain section of say one thousand links. Again, as it frequently may occur, a conveyer chain may jam at a certain point, thereby placing a strain on the links or their connections, which results in a lengthening of a chain section without breaking any of the parts thereof. While the use of a plurality of drives has many advantages over a single drive, it has been found that the variations in the length of different sections of the conveyer chain will at times tend to throw the entire driving load on but one or two of the driving units, and such units, in addition to having the entire driving load thrown upon them must also exert their power through the driving connections to the chain of the other drives which for the time are not exerting any driving influence.

The principal object of the present invention is to provide a new and improved construction for a conveyer of the type above set forth by means of which the difficulties above recited are successfully and satisfactorily overcome.

Another object is to provide a plurality of conveyer drives, each of which is automatically responsive to variations in the load respectively thrown upon it, thereby to effect an equalization and distribution of such load to the other drives.

A further object is to provide a plurality of conveyer drives, each of which includes a change speed device and means for adjusting said device automatically in accordance with variations in the load so as to insure a substantially uniform load upon each drive.

Another object is to provide a plurality of conveyer drives, each of which includes a variable speed driving device capable of being manually adjusted as desired and also including means automatically responsive to variations in load.

The above and other objects of the invention will appear more fully from the following more detailed specification and by reference to the accompanying drawings forming a part hereof and wherein:

Fig. 1 is a plan view, partly in section, of a driving unit for a conveyer, of the type above set forth, and constructed in accordance with the principles of the present invention.

Fig. 2 is a side elevation of the structure shown in Fig. 1.

Fig. 3 is a section on the line 3—3 of Fig. 1.

Fig. 4 is a plan view of a stationary supporting frame for a driving unit.

Fig. 5 is a plan view, partly in section, of a movable frame member which sets within and cooperates with the frame of Fig 4.

Fig. 6 is a transverse section through the pair of frame members showing them in associated position.

Figs. 7 and 8 are enlarged sectional details on the lines 7—7 and 8—8 respectively of Fig. 1.

Fig. 9 is a fragmentary plan view showing a modification of the invention in which an electric switch is employed for controlling the speed of rotation of a conveyer driving unit in accordance with the load conditions and Fig. 10 is a diagrammatic plan view of a conveyer system which includes a plurality of driving units constructed in accordance with the invention.

In order that the basic principles of the present invention will be more thoroughly understood reference will first be made to the diagrammatic showing of Fig. 10. In this figure the reference character 11 indicates an endless conveyer chain of the type hereinbefore referred to and which conveyer chain may be assumed to be several hundred feet in length and may travel in a path of any desired outline about a manufacturing plant. The rectangular path of travel of the chain 11 shown in Fig. 10 is merely diagrammatic and obviously is not intended to depict any actual installation or to in any way define the limits of the present invention. As hereinbefore pointed out the endless chains of conveyer systems of the type herein under discussion are of such great length that it is highly desirable to employ a number of driving units placed at spaced intervals about the conveyer's line of travel. In Fig. 10, four of such units are indicated and are generally designated by the reference characters M, A1, A2, A3. Each of these driving units includes a driving member, known in the art as a caterpillar drive, and which consists of an endless chain 12 trained about a pair of sprockets 13—14. The driving unit M may be considered as the master drive for the chain 11 and the units A1, A2, A3 auxiliary drives. All of the units M, A1, A2, A3, are of the same general construction with certain exceptions as to the master drive M which will hereinafter be pointed out more fully. The present invention relates more specifically to constructional features of the auxiliary drives A1, A2, A3 which will presently be described.

As hereinbefore pointed out variation in the lengths of different sections of the conveyer chain will at times tend to throw the entire driving load on but one or two members of the plurality of drives. For example that section of the chain which extends, considered in the direction of the arrows, from the driving unit A2 to the master drive M in Fig. 10 may, at some time in the operation of the conveyer, have been subject to an undue strain thereby producing a lengthening of that section, whereas the section extending from the master drive M to the driving unit A2 may have remained of substantially the same length as it was at the time of the original installation of the chain. Under such circumstances it will be readily understood that the upper half of the chain, that is the part extending from the master drive M to the drive A2 will be under tension and the full driving load will be thrown upon the driving units A1 and A2. Slack in the chain due to the greater length of the section thereof between the driving unit A2 and the master drive M prevents the driving unit A3 and the master drive M from exerting any driving force. Again it will be readily understood that the section of the chain between the drive A1 and the drive A2 may be shorter than the remaining sections so that the entire driving force would have to be exerted by the one driving unit A2. Under any of the above conditions excessive strain is naturally placed at times upon the various driving members. To avoid such excessive strains the construction now to be described has been invented.

By referring to Figs. 1 and 2 which show respectively in plan and in side elevation one of the driving units A1, A2 or A3, it will be seen that each unit consists of a main supporting frame 15 of rectangular configuration. This frame is shown most clearly in Fig. 4 of the drawings and is supported, as shown in Fig. 2, from the ceiling or any suitable supporting structure by the standards 16. The frame 15 is preferably constructed of a plurality of angle irons; the legs or webs or which are arranged to form a horizontal supporting surface 15A and a vertically extending peripheral flange 15b. The frame 15 is held in stationary position by the standards or brackets 16 as will be readily understood. Mounted within the stationary frame 15 is a movable frame 17 also of rectangular configuration. The frame 17 includes a pair of side rails 17a and 17b also preferably constructed of angle irons. Mounted between the side rails 17a and 17b and holding them in spaced relationship is a pair of end rails 17c and 17d and intermediate or transverse rails 17e and 17f. The end rails and transverse members are preferably constructed of suitable structural iron such as I beams.

Interposed between the frames 15 and 17 are a plurality of anti-friction rollers 18—19. The rollers 18 are mounted to rotate upon vertically extending axes and are supported upon bolts 20 extending between the horizontally extending webs of the side rails 17a—17b of the frame 17 and the horizontal webs of short pieces of angle iron 21 suitably secured to the side rails 17a—17b. The rollers 19 are mounted to rotate upon horizontally extending axles or bolts 22 extending between the vertical webs of the side rails 17a, 17b and of the angle irons 21 for supporting said rollers 19 all as clearly shown in Figs. 2, 5, 7 and 8 of the drawings.

Mounted upon the movable frame 17 is a base 23 which may be of any suitable construction, but which preferably is in the form of a casting having a horizontal peripheral flange 23a which serves as a means for securing the base 23 to the frame 17; in the example shown, bolts 24 pass through the flange 23a and are screwed into the upper webs of the transverse members 17e—17f. Suitably secured to the base 23 is a reduction gear 25, the driving shaft 26 of which has its outer end suitably supported in a bearing bracket 27. Secured to the shaft 26 is a bevel pinion gear 28, the teeth of which mesh with a bevel gear 29. The latter is secured to the upper end of a vertically extending shaft 30 which projects through suitable bearings provided in the base 23 and has secured to its lower end a spur pinion gear 31.

Meshing with the teeth of the pinion gear 31 is a driven gear 32 rotatably mounted upon a stub shaft 33 suitably anchored in the base 17. The driven gear 32 has fixed to it, preferably by safety shear pins 33, the driving sprocket 14 so that the sprocket 13 and gear 32 will rotate together as a unitary structure. As shown in Fig. 1 and in the diagrammatic view of Fig. 10 the chain 12 is driven by the sprocket 14. The axes of the sprockets 13—14 intersect a line which is inclined to the line of travel of the main conveyer chain 11. The sprocket chain 12 has pivotally secured to it a plurality of driving dogs 34 of well known construction, which insure that the pressure exerted by the caterpillar chain 12 in driving the main conveyer chain 11 will always be substantially normal to the contacting faces of the members of both chains at their points of contacting driving engagement. As will best be understood by referring to Fig. 10, the dogs 34 of the caterpillar chain 12 will pass into meshing engagement with the links of the main conveyer chain 11 as the chain 12, rotating in the direction of the arrows shown in Fig. 10, passes around the end of the sprocket 13, and, as the dogs travel towards the companion sprocket 14, for the chain 12, they will gradually pass out of engagement with the links of the conveyer chain 11.

Each sprocket 13 is rotatably mounted upon a stub shaft 35 similar to the shaft 33 hereinbefore referred to. Each shaft 35 is non-rotatably secured adjacent to its upper end in a slide plate 36 slidably mounted in a suitable guideway 37 formed in the base 23. This slidable mounting of the sprocket 14 is for the purpose of adjusting the tension in the caterpillar drive chain 12. For the purpose of securing the slide plate 36 in adjusted position each slide plate has swivelly engaged with it the end of an adjusting bolt 38 which passes through the vertical web for the adjacent transversely extending frame member 17e. The bolt 38 is provided with a usual hexagon head 38a or other suitable means for enabling the bolt to be readily rotated; lock nuts 39—40 are provided upon the adjusting bolt 38 for holding said bolt and its slide 36 in adjusted position.

The movable frame 17 as hereinbefore pointed out is mounted within the main supporting or stationary frame 15 and is normally urged towards one end of the frame 15 by the following means: A pair of bolts 41 pass freely through suitable apertures provided in the vertically extending web 15b of one of the end rails of the frame 15 and also through a similar aperture provided in the central web of the end rail 17d of the frame 17. Each bolt 41 is encircled by a coiled compression spring 42 the ends of which abut respectively against the vertical web 15b and a washer 43 held in place upon the bolt 41 by means of an adjusting nut 44.

In order to prevent the driving dogs 34 of the caterpillar chains 12 from sliding laterally out of engagement with the links of the conveyer chain 11 each frame 17 has secured thereto a guide rail 45 which is supported from the frame 17, in depending relationship thereto, by means of a plurality of brackets 46, and the guide rail 45, as most clearly shown in Figs. 2 and 5, is positioned in horizontal alignment with the main conveyer chain 11 and extends along said chain for a length thereof slightly greater than the length of the conveyer chain with which the dogs of the caterpillar chain are at any time in engagement.

Secured to the input shaft of the reduction gear 25 by any suitable means, such as a flexible coupling 50, is a driving or output shaft 51 of a variable speed driving device which may be of any suitable construction, but which is shown as a well known Reeves drive. This type of variable speed transmission, as is well known, consists of two pairs of cone pulleys 52—53, having their conical faces in opposed relationship and provided with means whereby one member of each pair of pulleys may be shifted axially relatively to its cooperating pulley member. An endless belt or chain 54 is trained about the pairs of pulleys 52—53, and the movable member of each pair of pulleys has secured to it a lever 55 which is pivotally mounted upon a fulcrum 56 located mid way between the axes of rotation of the pairs of pulleys 52, 53. The arrangement is such that when the lever 55 is rotated upon its fulcrum 56 the movable member of each pair of pulleys will have imparted to it a movement towards or from its cooperating pulley member equal in extent but opposite in direction to the movement of the movable member of the other pair of pulleys. This arrangement results in securing an axial movement of the two pulleys such that the arc of contacting engagement of the belt 54 with the faces of the pair of pulley members 52 and also the pair of pulley members 53 will be varied radially of the axes of rotation of said pulley members in accordance with the extent of movement given to the lever 55. The Reeves drive above described is of common well known construction and in accordance with such construction the pulley members and lever 56 are suitably mounted upon a rectangular frame 57 which in the particular constructional example herein illustrated is suitably supported upon the base 23.

One end of the lever 55 projects beyond the pair of pulley members 53, and has secured to it a nut 58 in threaded engagement with screw threads formed upon a shaft 59. The shaft 59 has its ends journaled for rotation within suitable bearing brackets 60, 61, and has secured upon its end a bevel gear 62 which meshes with a similar gear 63 suitably secured to the end of a shaft 64. The shaft 64 carries a pinion 65 which meshes with a rack 66, supported upon bracket 67 secured to the stationary frame 15 by means of braces 68. Fixed to the outer end of shaft 64 is a hand wheel 69 by means of which the Reeves drive may be manually set.

Pinion 65 is non-rotatably but slidably secured to the shaft 64 and is provided with an extension having an annular groove 65a therein, in which is received the yoked end of a lever 70, said lever serving as a manually operable means for enabling the pinion 65 to be slid into or out of mesh with the rack 66 for a purpose presently to be described. Any suitable means such as the stop pin 71 may be provided for locking the lever 70 in position to hold the pinion 65 in meshing engagement with the rack 66.

Trained about a sprocket 72, secured to the input shaft 73 of the Reeves drive, and also about a sprocket 74 secured to the armature shaft of an electric motor 75 is a sprocket chain 76, which in co-operation with its sprockets 72, 74 forms the driving connection from the electric motor to the Reeves drive.

The master drive M is similar in construction to the auxiliary drives A1 A2 A3 except that it is not provided with the spring pressed movable frame 17 nor with the rack 66 and pinion 65 arrangement such as associated with the auxiliary drives.

The manner in which the device as hereinbefore described operates is as follows:

The adjusting device for the Reeves drive of the master driving unit M, as well as the adjusting devices for each of the auxiliary driving devices, is adjusted to secure as nearly uniform driving conditions at the desired speed as possible after which the electric motors 75 for the driving units are energized, the control of said motors preferably being secured by means of a single main or master switch.

In setting the auxiliary drives, the stop pin 71 is removed and lever 70 is actuated to slide the pinion 65 laterally along its shaft 64 out of engagement with the rack 66, after which the hand wheel 69 is rotated to produce through gears 62, 63 and shaft 59 the desired adjustment, after which the pinion 65 is again placed in mesh with rack 66.

The motors 75 of all of the driving units being energized their rotation will be communicated through the sprockets 74, 72 and chain 76 to the input shaft 73 of the Reeves drive, thence through said drive to the input shaft of the reduction gear 25, through said gear to the shaft 26, bevel gears 28—29 to shaft 30, pinion 31 and gear 32. As gear 32 is rotated it carries with it the driving sprocket 14 for the caterpillar chain 12, the direction of travel of said chain being as indicated in Fig. 10. As the dogs 34 of the chain pass around the sprocket 13 they will engage between the links of the conveyer chain 11 and cause the same to be driven in the direction of the arrows in Fig. 10. It will be obvious from an inspection of Fig. 10 that the reaction upon the caterpillar chains will be in a direction opposite to the direction of the drive and consequently if, due to any of the causes hereinbefore set forth, too heavy a load is placed upon any one of the auxiliary drives, for example, the driving unit A1, its frame 17 will yield against the action of the springs 42, said frame moving rearwardly or to the left in Figs. 1 or 10. This movement of the frame 17 will be relatively to the frame 15, the latter being stationary, and a rolling or rotation of the pinion 65 upon the rack 66 will occur, thus producing a rotation of the shaft 64 which will be communicated through the bevel gears 63, 62 to the threaded shaft 59 in a direction such as to cause the Reeves drive to be adjusted to reduce the speed of travel of the caterpillar chain 12 of the drive A1. The springs 42 are adjusted to permit the above described movement of the frame 17 relatively to the stationary frame 15 whenever the pressure or load thrown upon the chain 12 carried by the respective frame 17 exceeds a certain predetermined amount according to the particular design or installation. The backward movement of the frame 17 in combination with the automatic reduction of speed of its chain 12 will quickly reduce the driving effect of said chain, as will be readily understood, until the driving effect of or pressure reaction on the chain is brought below the predetermined amount. When this occurs, the excess driving pressure being released the frame 17 will be returned to its normal position by the springs 42, and in its return will cause the control or adjusting means of the Reeves drive to be actuated in a direction reverse to that above described to bring about an acceleration of the speed of the chain 12. It will be seen from the foregoing that each auxiliary driving unit will be, as it were, in a balanced condition, being automatically decelerated or accelerated in accordance with variations in the load thrown upon it. As the master drive M however is not made responsive to such load variations its set or adjusted speed of travel will remain unaltered, consequently there will be no alteration of the set speed of the conveyer chain and its speed will remain uniform in accordance with the setting of the master drive.

In Fig. 9 of the drawings is shown a modified construction in which the movement of the movable frame 17 is used to actuate a limit switch 80. As the constructional details of such switches form no part of the present invention, and moreover as they are a standard commercial article the details thereof have not been shown in the drawings. The switch illustrated is of the type wherein the switch actuating arm 81 is pivotally mounted at its upper end in the switch casing and is provided at its lower end with an antifriction roller 82. This roller lies in the path of movement of a part of the movable frame 17 as shown, the frame carries an adjustable screw 83, having at its end a plate 84 adapted to engage the roller 82. The lower end of the switch arm 81 is normally urged by a suitable spring (not shown) which forms a part of the commercial limit switch, towards the right in Fig. 9. When the frame 17 is caused, by an excess load, to move towards the left the plate 84 will engage with the roller 82 and throw the switch 80 to cause the circuit to its motor 75 to be broken, thus stopping the motor. Stoppage of the motor will immediately cause the driving effect of the chain to cease, thus permitting the frame 17 to be moved towards the right by the springs 42, the plate 84 moving with the frame allowing the switch arm 81 to move to the right and as soon as the frame returns to its predetermined normal operating position the switch 80 will close the circuit to its motor 75 thereby placing the driving unit in operative driving relationship to the conveyer chain.

The limit switch shown in Fig. 9 may also be used in combination with the Reeves drive construction shown in Figs. 1 to 3 inclusive of the drawings in which case said switch will be employed as a safety device and the plate 84 will be adjusted to cause the limit switch to be opened when the springs 42 are compressed to their fullest extent.

It will be seen from the foregoing description that in both forms of the invention the frame 17 of each of the auxiliary driving units is moved automatically in response to variations in the load placed upon the respective caterpillar chains and that such movement of the said frames is employed to cause deceleration and acceleration of the driving speed of said caterpillar chains.

The particular constructional examples herein disclosed have been selected merely as illustrative of the principles of the invention and not as limiting the invention to the specific details selected for illustration, it will therefore be understood that many changes, variations and modifications of such details may be resorted to without departing from such principles, for example, although a Reeves drive has been shown and described as the variable speed transmission employed it will be obvious that the invention is not limited to this specific type of transmission but as hereinbefore pointed out any suitable variable speed driving device may be used.

We claim:

1. The combination with a continuous conveyer of a plurality of driving units located at spaced intervals along said conveyer, each of said driving units including means responsive to an increase in the driving load placed upon it beyond a predetermined amount to check its driving effect.

2. The combination with an endless conveyer chain of a plurality of driving units located at spaced intervals along said chain in driving relationship therewith, each of said units being mounted upon a frame having limited movement in the direction of travel of said chain, and means for normally urging said frame towards the direction of travel of said chain to hold said driving unit with a predetermined driving pressure against said chain.

3. The combination with an endless conveyer chain of a plurality of driving units each having a driving member in meshing engagement with the links of said chain, a movable frame for certain of said driving units, and resilient means associated with said frame for normally holding its respective driving member with a predetermined pressure against said chain and for providing compensating movement of said frame and driving unit relatively to said chain when the driving force exerted by said driving member exceeds a predetermined amount.

4. The combination with an endless conveyer chain of a plurality of driving units including a master driving unit, associated therewith, each of said units including a driving member in meshing engagement with the links of said chain, each of said units with the exception of said master unit including resilient means for providing compensating movement of its respective driving member relatively to said chain when the driving force exerted by said member exceeds a predetermined amount.

5. The combination with an endless conveyer chain, of a master driving unit, and a plurality of auxiliary driving units located at spaced intervals along said chain, each of said auxiliary units including means for automatically reducing the driving pressure exerted by it on said chain whenever said pressure tends to exceed a predetermined maximum.

6. The combination with an endless conveyer chain of a master driving unit of variable effect and a plurality of auxiliary driving units also of variable effect, located at spaced intervals along said chain and in driving relationship therewith, each of said auxiliary units including means for automatically reducing its speed of rotation when the driving force exerted by it upon said chain exceeds a predetermined maximum.

7. A driving unit for an endless conveyer chain comprising a stationary support, a movable frame carried by said support, driving means carried by said movable frame and including a driving member in meshing engagement with said conveyer chain and resilient means interposed between said movable frame and support whereby bodily movement of said movable frame and the driving means carried thereby can occur in a direction parallel to the movement of travel of said conveyer chain.

8. A driving unit for an endless conveyer chain comprising a supporting frame, a base mounted on said frame for movement parallel to the direction of travel of said chain, driving means carried by said base including a variable speed device and means operatively associated with said base and frame for producing a variation of said variable speed device upon relative movement between said frame and base.

9. The combination with an endless conveyer chain, of a master driving unit and a plurality of auxiliary driving units arranged in driving relationship with said chain at spaced intervals along its path of travel, each of said auxiliary units including pressure responsive means and a variable speed device operatively associated with said pressure responsive means for automatically effecting deceleration or acceleration respectively in the speed of such unit in accordance with increase or decrease of the driving force exerted by said unit on said chain.

10. The combination with an endless conveyer chain of a master driving unit having means to adjust its speed and maintain it at a predetermined rate, and a plurality of auxiliary driving units, each including a variable speed device adapted to be set to operate at the same rate of speed as said master unit, each of said auxiliary units including a stationary frame, a movable frame, a pressure responsive device interposed between said frames, and means operatively associated therewith for causing said variable speed device to be adjusted automatically to decrease and increase the rate of speed of said auxiliary unit in accordance with variations from a predetermined amount of the pressure exerted by said auxiliary unit upon said chain.

11. A driving unit for an endless conveyer chain comprising a stationary frame, a movable frame carried by said stationary frame, a caterpillar chain and driving means therefor mounted on said movable frame, said driving means including a variable speed gear and means automatically responsive to variations in the driving effect of said caterpillar chain for varying said variable speed gear.

12. A driving unit for an endless conveyer chain comprising a stationary frame, a movable frame carried by said stationary frame, a caterpillar chain and driving means therefor mounted on said movable frame, said driving means including a variable speed gear, means automatically responsive to variations in the driving effect of said caterpillar chain for varying said variable speed gear, and manually operable means for setting said variable speed device in predetermined adjusted position.

13. A driving unit for an endless conveyer chain comprising a stationary frame, a movable frame carried by said stationary frame, a caterpillar chain and driving means therefor mounted on said movable frame, said driving means including a variable speed gear, means automatically responsive to variations in the driving effect of said caterpillar chain for varying said variable speed gear, manually operable means for setting said variable speed device in predetermined adjusted position, and means for selectively placing said automatically responsive means into and out of operative position.

14. A driving unit for an endless conveyer chain comprising a stationary frame, a movable frame carried by said stationary frame, a caterpillar chain and driving means therefor mounted on said movable frame, said driving means including a variable speed gear, resilient means connected with said movable and stationary frames for normally holding said caterpillar chain with a predetermined pressure in driving relationship with said conveyer chain, and means operatively associated with said frames for automatically producing through said variable speed device a variation in speed of said caterpillar chain in accordance with variations from said predetermined pressure of the driving force exerted by said caterpillar chain upon said conveyer chain.

15. A driving unit for an endless conveyer chain comprising a stationary frame, a movable frame carried by said stationary frame, a caterpillar chain and driving means therefor mounted on said movable frame, said driving means including a variable speed gear, resilient means connected with said movable and stationary frames for normally holding said caterpillar chain with a predetermined pressure in driving relationship with said conveyer chain, and means operatively associated with said frames for automatically producing through said variable speed device a variation in speed of said caterpillar chain in accordance with variations from said predetermined pressure of the driving force exerted by said caterpillar chain upon said conveyer chain, and safety means for stopping said driving unit when the pressure exerted by said caterpillar chain exceeds a predetermined amount.

16. A driving unit for an endless conveyer chain comprising a stationary frame, a movable frame carried by said stationary frame, a base secured to said stationary frame, a caterpillar chain drive carried by said base and comprising a pair of spaced sprockets and an endless chain trained about said sprockets, means for driving said sprockets, including an electric motor and a variable speed gear, pressure responsive means interposed between said frames for normally holding them in a predetermined relative position, and means operatively associated with said frames and said variable speed gear for varying the driving speed of the latter automatically in accordance with variations in the relative position of said frames from said predetermined position.

17. A driving unit for an endless conveyer chain comprising a stationary frame, a movable frame carried by said stationary frame, a base secured to said movable frame, a caterpillar chain drive carried by said base and comprising a pair of spaced sprockets and an endless chain trained about said sprockets, means for driving said sprockets including an electric motor and a variable speed gear, pressure responsive means interposed between said frames for normally holding them in a predetermined relative position, and gearing interposed between said frames and connected with said variable speed gear for changing the adjustment of said speed gear.

18. A driving unit for an endless conveyer chain comprising a stationary frame, a movable frame carried by said stationary frame, a base secured to said movable frame, a caterpillar chain drive carried by said base and comprising a pair of spaced sprockets and an endless chain trained about said sprockets, means for driving said sprockets, including an electric motor, electric switch means carried by said frames for interrupting the circuit to said motor, and pressure responsive means interposed between said frames for normally holding them in a predetermined position in which said switch means is closed.

In testimony whereof we affix our signatures hereto.

JERVIS B. WEBB.
DUANE A. BLAIR.
CHARLES A. SINK.